(12) United States Patent
Heber et al.

(10) Patent No.: US 11,378,831 B2
(45) Date of Patent: Jul. 5, 2022

(54) METHOD AND DISPLAY FOR THE PRESENTATION OF IMAGE CONTENTS IN AT LEAST TWO OPERATION MODES

(71) Applicant: siOPTICA GmbH, Jena (DE)

(72) Inventors: André Heber, Weimar (DE); Yannick Bourgin, Ilmtal-Weinstrasse OT Ossmannstedt (DE); Markus Klippstein, Jena (DE)

(73) Assignee: siOPTICA GmbH, Jena (DE)

( * ) Notice: Subject to any disclaimer, the term of this patent is extended or adjusted under 35 U.S.C. 154(b) by 0 days.

(21) Appl. No.: 17/150,405

(22) Filed: Jan. 15, 2021

(65) Prior Publication Data

US 2021/0223583 A1 Jul. 22, 2021

(30) Foreign Application Priority Data

Jan. 17, 2020 (DE) .......................... 102020000347.8

(51) Int. Cl.
  *G02F 1/1335* (2006.01)
  *G02F 1/13* (2006.01)
  (Continued)

(52) U.S. Cl.
  CPC ............ *G02F 1/1323* (2013.01); *B60K 35/00* (2013.01); *G02F 1/1336* (2013.01); *G09G 3/003* (2013.01);
  (Continued)

(58) Field of Classification Search
  CPC ..... G02F 1/1323; G02F 1/1336; B60K 35/00; B60K 2370/1526; G09G 3/3225;
  (Continued)

(56) References Cited

U.S. PATENT DOCUMENTS

2009/0290079 A1* 11/2009 Evans .................. H04N 13/322
  359/479
2012/0235891 A1 9/2012 Nishitani et al.
(Continued)

FOREIGN PATENT DOCUMENTS

DE         197 37 942 A1    3/1999
DE    10 2014 204 462 A1    9/2015
(Continued)

*Primary Examiner* — Abdul-Samad A Adediran
(74) *Attorney, Agent, or Firm* — Christensen, Fonder, Dardi & Herbert PLLC

(57) ABSTRACT

A method for presenting image content in two operating modes, B1 for a viewing mode with a restricted viewing angle, and B2 for a viewing mode with an unrestricted viewing angle, comprising: providing a first image generator radiating image content into a restricted viewing angle; providing a second image generator radiating image content into an unrestricted viewing angle, wherein the second generator is in front of the first, and is partially transparent to light from the first, and deflects, on at least 50% of its surface, at least 90% of the light passed by it, by maximally 10°; switching on the first generator to start mode B1, wherein the second generator is switched to a transparent state and scatters only a negligible portion of light from the first generator, to retain the restricted viewing angle; and switching on the second generator to start mode B2.

16 Claims, 3 Drawing Sheets

(51) Int. Cl.
*G09G 3/3225* (2016.01)
*G09G 3/36* (2006.01)
*B60K 35/00* (2006.01)
*G02F 1/13357* (2006.01)
*G09G 3/00* (2006.01)
*H04N 13/322* (2018.01)

(52) U.S. Cl.
CPC ......... *G09G 3/3225* (2013.01); *G09G 3/3648* (2013.01); *H04N 13/322* (2018.05); *B60K 2370/1526* (2019.05); *G09G 2320/028* (2013.01); *G09G 2320/068* (2013.01)

(58) Field of Classification Search
CPC ........... G09G 3/3648; G09G 2320/028; G09G 2320/068; G09G 3/003; H04N 13/322
USPC ......................................................... 359/479
See application file for complete search history.

(56) References Cited

U.S. PATENT DOCUMENTS

| | | |
|---|---|---|
| 2013/0008185 A1 | 1/2013 | Newman et al. |
| 2013/0308185 A1 | 11/2013 | Robinson et al. |
| 2017/0069236 A1* | 3/2017 | Klippstein ............. G09G 3/003 |
| 2018/0335655 A1* | 11/2018 | Alkhimenko ......... G02F 1/1336 |

FOREIGN PATENT DOCUMENTS

| | | |
|---|---|---|
| DE | 10 2018 004 401 A1 | 12/2019 |
| GB | 2 418 518 A | 3/2006 |
| JP | 2007155783 A | 6/2007 |
| WO | WO 2004/036286 A1 | 4/2004 |
| WO | WO 2012/033583 A1 | 3/2012 |
| WO | WO 2015/121398 A1 | 8/2015 |
| WO | WO 2019/229020 A1 | 12/2019 |

\* cited by examiner

METHOD AND DISPLAY FOR THE PRESENTATION OF IMAGE CONTENTS IN AT LEAST TWO OPERATION MODES

PRIORITY CLAIM

The present application claims priority to German Patent Application No. 10 2020 000 347.8, filed on Jan. 17, 2020, which said application is incorporated by reference in its entirety herein.

FIELD OF THE INVENTION

In recent years, great strides have been made in enlarging the visual angle of LCDs. Frequently, however, there are situations in which such a very large angular viewing range of a display screen can be a disadvantage. Increasingly, information such as banking data or other private particulars and sensitive data is becoming available on mobile devices such as notebooks and tablet PCs. Accordingly, users require some control of who is allowed to see such sensitive data; they must be able to choose between a wide viewing angle in order to share information displayed on their screen with others, e.g., when looking at vacation snaps or reading advertisements, and, on the other hand, a narrow viewing angle if they want to keep image information private.

A similar problem is encountered in vehicles: Here, when the motor is running, the driver must not be distracted by image contents such as digital entertainment shows, whereas a front-seat passenger would like to watch them during the ride. This requires a screen that can be switched between corresponding display modes.

BACKGROUND OF THE INVENTION

In WO 2012/033583, switching between free and restricted viewing is effected by means of triggering liquid crystals disposed between so-called "chromonic" layers. This is a rather complex process and entails a loss of light.

US 2012/0235891 describes a very complicated backlight unit in a display screen. As shown there in FIGS. 1 and 15, this design features not only several light guides, but also further complex optical elements such as, e.g., microlens elements 40 and prism structures 50, which convert the light coming from the backlight unit as it travels to the frontlight unit. This is expensive and complicated to realize and involves loss of light. In accordance with the version illustrated in FIG. 17 in US 2012/0235891, the light sources 4R and 18 both produce light with a narrow illuminating angle, with the light from the backlight source 18 needing to be converted into light with a large illuminating angle. This is a complex process, which greatly diminishes brightness, as remarked above.

According to JP 2007-155783, special optical surfaces, which are designed and manufactured in a complicated process, are used to deflect light into varied narrow or wide ranges, depending on the angle of incidence. These structures resemble Fresnel lenses, having inactive edges, which deflect light into undesirable directions. Thus, it remains uncertain whether light distributions can be attained in that way that actually make sense.

In US 2013/0308185, a special light guide provided with steps is described, which on a large surface radiates light into various directions, depending on the direction from which it is illuminated from one of the edges. In interaction with a transmissive image-generating device, e.g., an LC display, a display screen that is switchable between a free and a restricted viewing mode can be created. As a disadvantage, among others, the restricted view effect can be created either in a left/right arrangement only or in a top/bottom arrangement only, but not simultaneously for a left/right and top/bottom arrangement, as would be required for certain payment procedures. In addition, residual light remains visible from blocked viewing angles even in the restricted viewing mode.

The applicant's WO 2015/121398 describes a display screen of the type described at the outset. For switching between operating modes, this screen essentially features scattering particles in the volume of the respective light guide. Made of a polymerizate, the scattering particles selected there have the disadvantage, as a rule, that light is outcoupled from both large surfaces, whereby about half the useful light is radiated into the wrong direction, i.e. toward the background illuminator, where, on account of the set-up, it cannot be recycled to a sufficient extent. Moreover, if need be, especially at a higher concentration, the polymerizate scattering particles distributed in the volume of the light guide may lead to scattering effects that diminish privacy effects in the protected operating mode.

As a rule, the methods and arrangements outlined above have the disadvantage in common that that they markedly reduce the brightness of the basic display screen and/or need a complex and expensive optical element for switching between the modes and/or reduce resolution in the free viewing mode.

SUMMARY OF THE INVENTION

Departing therefrom, the problem of the present invention is to describe a method and a display screen with the help of which a switchable privacy effect for a display screen of plain design can be attained. The invention is intended to be implemented by simple means and, as far as possible, to operate independently of the way of creating the privacy effect. The invention is further intended optionally to provide a possibility of presenting different images to different directions.

According to the invention, this problem is solved by a method for presenting image contents in at least two operating modes, viz B1 for a viewing mode with a restricted viewing angle, and B2 for a viewing mode with an unrestricted viewing angle, comprising the following steps:

Provision of a first image generator, which radiates image contents into a restricted viewing angle, provision of a second image generator, which radiates image contents into an unrestricted viewing angle, wherein the second image generator is arranged in front of the first image generator (as seen in the viewing direction) and at least is partially transparent to light originating from the first image generator, wherein the second image generator is adapted to deflect, on at least 50% of its surface, at least 90% of the light passed by it, by maximally 10°, switching the first image generator on to start operating mode B1 for a viewing mode with a restricted viewing angle, wherein the second image generator is switched to be transparent and, due to its limited scattering properties, scatters only a negligible portion of the light originating from the first image generator when it passes the second image generator, so that the restricted viewing angle is retained, switching at least the second image generator on to start operating mode B2 for a viewing mode with an unrestricted viewing angle.

Preferably, the second image generator is adapted even to deflect, on at least 80% of its surface or on its total image-presenting surface, at least 90% or preferably more than 95% of the light passed by it, by maximally 10°.

The term "negligible" with regard to scattering means, for example, that in an angle of, e.g., horizontally 40° from the surface normal, scattering adds maximally 1% of the luminance, which the first image generator radiates into an angle of 0°.

Further, in operating mode B2, the first image generator may either be switched off, or, in its switched-on state, present a dark, preferably black image content. In that way, the image presented on the second image generator is least overlaid, i.e. least interfered with.

In another favorable embodiment of the invention, the second image generator in its switched-on state in operating mode B1 presents image content that dissolves potential residual light of the first image generator, visible outside the restricted viewing angle. Such image content may be, e.g., a full-frame gray image or a full-frame, not too bright monochrome image. "Not too bright", in this case, means that the image generator radiates only a few $cd/m^2$. Completely other image contents are possible as well, of course.

The first image generator may be, e.g., an LCD, microLED, miniLED, or OLED screen, on which or in which an optical component for light direction is attached, such as, e.g., a lamellar filter of the 3M™ Vikuiti type. Alternatively, it is possible for the first image generator to be configured otherwise so as to merely illuminate a restricted viewing angle.

In this connection, a restricted viewing angle may mean, e.g., an angular range of +/−30 degrees or +/−20 degrees about the vertical bisector of the first image generator, applied in the horizontal and/or vertical direction. Alternatively, the datum may not be the vertical bisector but a straight line inclined to it.

The second image generator may be, e.g., a transparent LCD, microLED, miniLED, or OLED screen. Other possible versions include an augmented reality screen, a scattering projection, or a screen based on polymer-dispersed liquid crystals (PDLC). "Transparent" in this connection means that the second image generator transmits at least 15% of the light incident to it from the rear. This value is intended to apply to non-polarized light.

In another embodiment of the invention, the first image generator radiates image contents in a restricted viewing angle only on part of its image area, whereas on the remaining part, image contents are radiated into an unrestricted viewing angle. Thus, the said remaining part would be visible from every viewing direction at any time.

It is further possible that the first image generator is also at least partially transparent, wherein "transparent" means that the first image generator transmits at least 15% of the light incident to it from the rear. In this connection, "transparent" means also that the second image generator transmits at least 15% of the light incident to it from the rear. This value is intended to apply to non-polarized light.

Finally, it is feasible that switching the second image generator on in operating mode B2 creates a modified operating mode B2A, in which image contents are presented in a restricted viewing angle simultaneously in two planes, whereas outside of the restricted viewing angle one can only see the contents presented on the second image generator in one plane.

In a special embodiment of the invention, the first image generator is switchable between a viewing mode B1A with a restricted viewing angle and a viewing mode B1B with an unrestricted viewing angle, so that
    if the viewing mode B1A is used and the second image generator is switched to be transparent, the operating mode B1 is created,
    if the viewing mode B1B is used and the second image generator is switched on, a third operating mode B3 is created, in which image contents are presented simultaneously in two planes in a viewing mode with an unrestricted viewing angle, and that,
    if the viewing mode B1A is used and the second image generator is switched on, a fourth operating mode B4 is created, in which image contents are presented simultaneously in two planes, whereas outside the restricted viewing angle one can only see the contents presented on the second image generator in one plane.

The problem of the invention is also solved by a display screen that can be operated in at least two operating modes, viz B1 for a viewing mode with a restricted viewing angle, and B2 for a viewing mode with an unrestricted viewing angle, comprising
  a. a first image generator, which radiates image contents into a restricted viewing angle,
  b. a second image generator, which radiates image contents into an unrestricted viewing angle, wherein the second image generator is arranged in front of the first image generator (as seen in the viewing direction) and is at least partially transparent to the light originating from the first image generator, and wherein the second image generator is adapted to deflect, on at least 50% of its surface, at least 90% of the light passed by it, by maximally 10°,
  c. means for switching the first image generator and the second image generator on and off, so that
    i. the first image generator for the operating mode B1 is switched on for a viewing mode with a restricted viewing angle, wherein the second image generator is switched to a transparent state and, due to its limited scattering properties, scatters only a negligible portion of the light originating from the first image generator when it passes the second image generator, so that the restricted viewing angle is retained, and that
    ii. at least the second image generator is switched on to start the operating mode B2 for a viewing mode with an unrestricted viewing angle.

Here it may possibly be of advantage if, in operating mode B1, the switched-on second image generator presents image content that dissolves any potential residual light of the first image generator visible outside the restricted viewing angle. In this way, particularly good visual screening can be achieved in the first operating mode B1, because, depending on the screening method implemented, any residual light of the presented image content visible outside the restricted viewing angle can thus be dissolved with high targeting accuracy.

To avoid redundancy, further possible embodiments of the invented method that can be implemented analogously to the above description are not detailed herein.

The further, optional problem of the invention is solved by a method for presenting two different image contents I1 and I2 at different viewing angles W1 and W2, comprising the following steps:
    Provision of a first image generator, which radiates the image content I1 into the viewing angle W1,
    provision of a second image generator, which radiates the image content I2 into the viewing angle W2, wherein the second image generator is arranged in front of the first image generator (as seen in the viewing direction), and is at least partially transparent to light originating from the first image generator, and wherein the second image generator is adapted to deflect, on at least 50% of its surface, at least 90% of the light passed by it, by maximally 10°, wherein, due to its limited scattering properties, the second image generator scatters only a negligible portion of the light originating from the first image generator when it passes the second image generator, so that the viewing angle W1 for the image content I1 is retained.

Here again, the second image generator is preferably adapted even to deflect, on at least 80% of its surface or on its total image-presenting surface, at least 90% or preferably more than 95% of the light passed by it, by maximally 10°.

The term "negligible" with regard to scattering means, for example, that in an angle of, e.g., horizontally 40° from the surface normal, scattering adds maximally 1% of the luminance, which the first image generator radiates into an angle of 0°.

The invented methods and the invented display screen described above can be used, e.g., in a motor vehicle.

In principle, the performance of this invention remains unaffected even if the parameters described above are varied within certain limits.

It is understood that, without leaving the scope of the present invention, the features mentioned before and those to be explained below are applicable not only in the combinations stated but also in other combinations or as stand-alone features.

BRIEF DESCRIPTION OF THE DRAWINGS

Below, the invention will be explained in more detail with reference to the accompanying drawings, which also show features essential to the invention, among others, and in which.

The drawings are not to scale and illustrate principles only.

DETAILED DESCRIPTION

Figure 1:
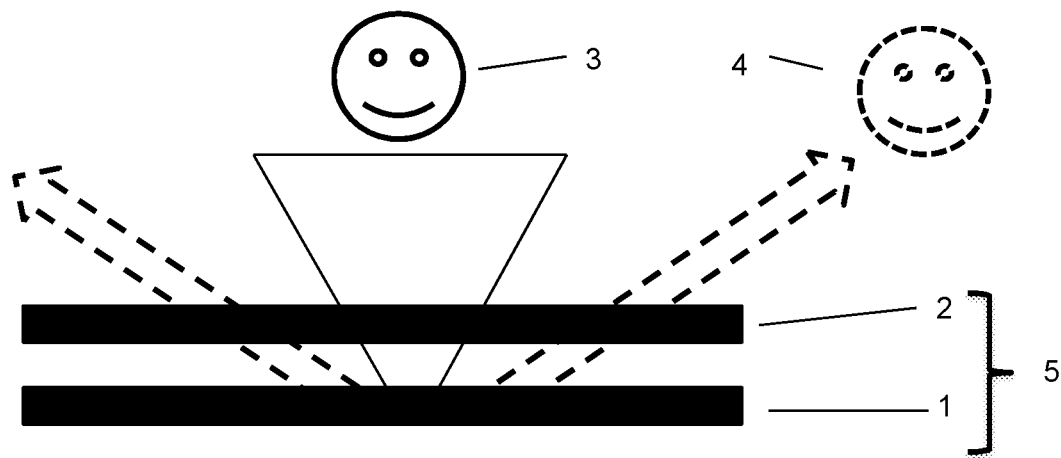
FIG. 1 is a schematic representation of the invented method in operating mode B1.

FIG. 1 is a schematic representation of the invented method in operating mode B1.

Figure 2:
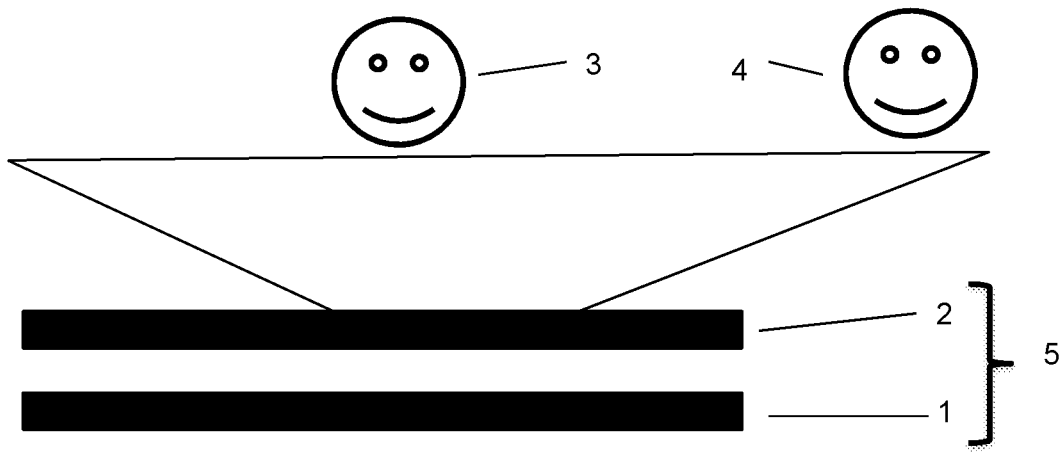
FIG. 2 is a schematic representation of the invented method in operating mode B2.

The invented method for the presentation of image contents in at least two operating modes, viz B1 for a viewing mode with a restricted viewing angle, and B2 for a viewing mode with an unrestricted viewing angle comprises the following steps:

Provision of a first image generator 1, which radiates image content into a restricted viewing angle (the restricted viewing angle is represented by the black triangle; the broken arrows suggest that only low residual light values are radiated into these viewing angles, which amount to no more than maximally 5% of the peak brightness—e.g., but not necessarily, in the vertical direction; ideally, the residual light values would be equal to zero candela per square meter), provision of a second image generator 2, which radiates image content in an unrestricted viewing angle, wherein the second image generator 2 is arranged in front of the first image generator 1 (as seen in the viewing direction), and is at least partially transparent to light originating from the first image generator 1, wherein the second image generator 2 is adapted to deflect, on at least 50% of its surface, at least 90% of the light passed by it, by maximally 10°, switching on the first image generator 1—as shown in FIG. 1—in operating mode B1 for a viewing mode with a restricted viewing angle, wherein the second image generator 2 is switched to be transparent and, due to its limited scattering properties, scatters only a negligible portion of the light originating from the first image generator when it passes the second image generator, so that the restricted viewing angle is retained, whereby the viewer 3 can see the image content presented, whereas the viewer 4, who is positioned outside the restricted viewing angle, does not see it, or at least not well (for which reason the viewer 4 is drawn in broken lines), switching on at least the second image generator 2—as shown in FIG. 2—in operating mode B2 for a viewing mode with an unrestricted viewing angle.

The first image generator 1 and the second image generator 2 jointly make up a display screen 5, which features an electronic control system not shown in the drawing.

FIG. 2 is a schematic representation of the invented method in operating mode B2. The broad triangle symbolizes that the second image generator 2 radiates image content into an unrestricted viewing angle, since now the viewers 3 and 4 are simultaneously arranged within the viewing angle.

The second image generator 2 is preferably adapted even to deflect, on at least 80% of its surface or on its total image-presenting surface, at least 90% or preferably more than 95% of the light passed by it, by maximally 10°.

The term "negligible" with regard to scattering means, for example, that in an angle of, e.g., horizontally 40° from the surface normal, scattering adds maximally 1% of the luminance, which the first image generator radiates into an angle of 0°.

The first image generator 1 may be, for example, an LCD, microLED, miniLED, or OLED screen, onto which or in which an optical component for directing the light is attached, such as, e.g., a lamellar filter of the 3M™ Vikuiti type. Alternatively, it is possible for the first image generator 1 to be configured otherwise so as to merely illuminate a restricted viewing angle.

In this connection, a restricted viewing angle may mean, e.g., an angular range of +/−30 degrees or +/−20 degrees about the vertical bisector of the first image generator 1, applied in horizontal and/or vertical direction. Instead of the vertical bisector, the datum may also be a straight line inclined relative to the said vertical bisector.

Other possible versions include an augmented reality screen, a scattering projection, or a screen based on polymer-dispersed liquid crystals (PDLC). "Transparent" in this connection means that the second image generator 2 transmits at least 15% of the light incident to it from the rear. This value is intended to apply to non-polarized light.

Alternatively, it is feasible that switching the second image generator 2 on in the operating mode B2 creates a modified operating mode B2A, in which image content is presented simultaneously in two planes in a restricted viewing angle, whereas outside the restricted viewing angle one can only see the content presented on the second image generator 2 in one plane.

Figure 3:
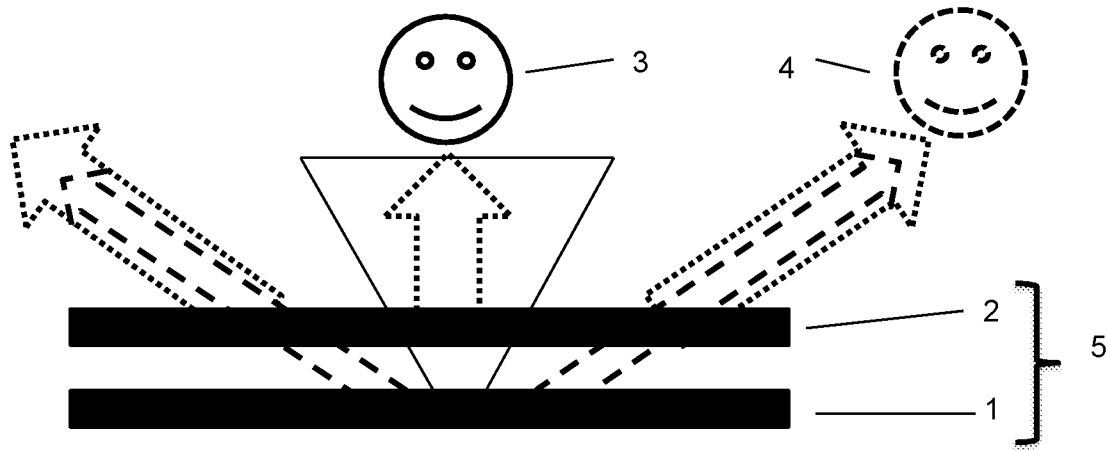
FIG. 3 is a schematic representation of the invented method in operating mode B1, wherein a special embodiment for dissolving residual light takes effect.

In another favorable embodiment of the invention, shown in FIG. 3, the switched-on second image generator 2 presents, in operating mode B1, image content that dissolves potential residual light of the first image generator 1 visible outside the restricted viewing angle. Such image content may be, e.g., a full-frame gray image or a full-frame non-bright monochrome image. "Non-bright" means, in this case, that the image generator radiates merely a few cd/m$^2$, maximally 30 cd/m$^2$. In FIG. 3, the explanations of FIG. 1 given above apply analogously. The dotted arrows, however, symbolize the light radiated by the second image generator 2 of the abovementioned image content used for dissolution. The dissolution, to be true, is a disadvantage also affecting the restricted angular range, in which the viewer 3 can see, and is intended to see, the image content presented. Because, however, the dissolution introduces but little brightness, as described above, there remains a well visible image of rich contrast for the viewer 3 to see. For further enhancement of the quality of the image visible by viewer 3, though, the image content presented on the second image generator 2 can be controlled adaptively as a function of the image content of the first image generator 1. Darker image contents on the first image generator 1, then, will permit darker image contents on the second image generator 2 as well.

Figure 4:
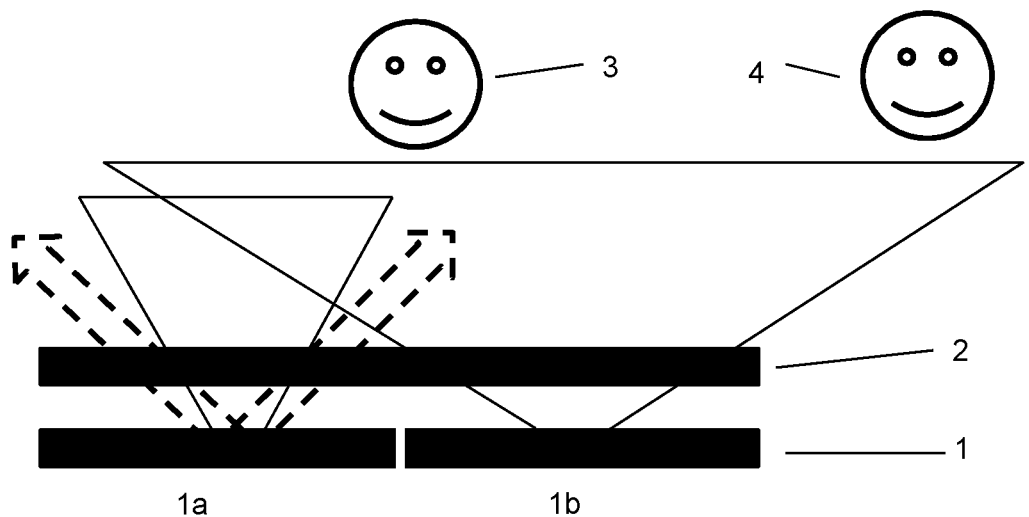
FIG. 4 is a schematic representation of the invented method, wherein the first display screen has two presentation areas.

In another embodiment of the invention, which is demonstrated in FIG. 4, the first image generator 1 radiates image content into a restricted viewing angle on only a partial area 1a of its imaging surface, whereas the remaining part 1b radiates image content into an unrestricted viewing angle. The said remaining part thus would be visible at any point of time, from any viewing direction and, in particular, by the viewer 4, whereas the image content of the partial area 1a visible in a restricted viewing angle could only be seen by the viewer 3. This version can be used to advantage in the embodiments described above as well as in those described below.

Figure 5:
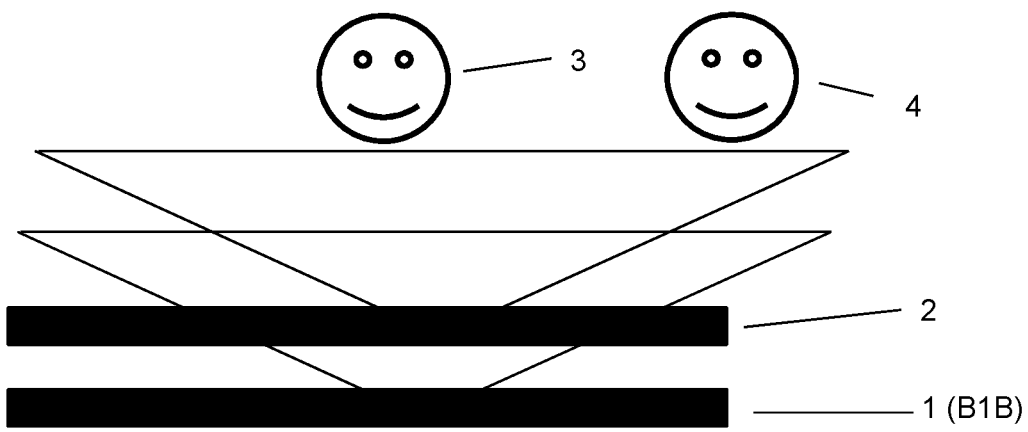
FIG. 5 is a schematic representation of the invented method, wherein a special embodiment for creating another operating mode B3 takes effect.
Figure 6:
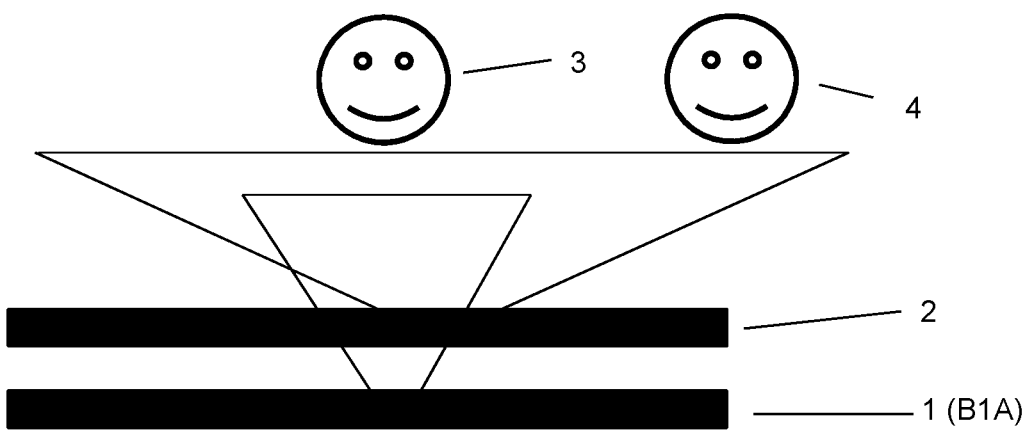
FIG. 6 is a schematic representation of the invented method, wherein a special embodiment for creating yet another operating mode B4 takes effect.

In a special embodiment of the invention, the first image generator 1 is switchable between a viewing mode B1A with a restricted viewing angle and a viewing mode B1B within an unrestricted viewing angle, so that
 using the viewing mode B1A, and switching the second image generator 2 to the transparent state will establish the operating mode B1 (see FIG. 1), and that
 using the viewing mode B1B and switching the second image generator 2 on will establish a third operating mode B3 illustrated in FIG. 5, in which mode image content is presented simultaneously in two planes, in a viewing mode with an unrestricted viewing angle (that image content, then, has a certain spatial effect for the viewers 3 and 4, due to the two planes, and so that
 using the viewing mode B1A and switching the second image generator 2 on creates a fourth operating mode B4 illustrated in FIG. 6, in which image content is presented simultaneously in two planes in a restricted viewing angle to viewer 3, whereas someone outside the restricted viewing angle, e.g., the viewer 4, will only see the content presented in one plane on the second image generator 2.

The problem of the invention is solved likewise by a display screen 5 that can be operated in at least two operating modes, viz B1 for a viewing mode with a restricted viewing angle and B2 for a viewing mode with an unrestricted viewing angle, comprising
 a. a first image generator 1, which radiates image content into a restricted viewing angle,
 b. a second image generator 2, which radiates image content into an unrestricted viewing angle, wherein the second image generator 2 is arranged in front of the first image generator 1 (as seen in the viewing direction) and is at least partially transparent to the light originating from the first image generator 1, and wherein the second image generator 2 is adapted to deflect, on at least 50% of its surface, at least 90% of the light passed by it, by maximally 10°,
 c. means for switching the first image generator 1 and the second image generator 2 on and off (not shown in the drawings), so that
  iii. the first image generator 1 is switched on to start the operating mode B1 (see FIG. 1) for a viewing mode with a restricted viewing angle, wherein the second image generator 2 is switched to a transparent state and, due to its limited scattering properties, scatters only a negligible portion of the light originating from the first image generator (1) when it passes the second image generator (2), so that the restricted viewing angle is retained, and so that
  iv. at least the second image generator (2) is switched on to start the operating mode B2 for a viewing mode with an unrestricted viewing angle.

Here it may possibly be of advantage if, in operating mode B1, the switched-on second image generator 2 presents image content that dissolves any potential residual light of the first image generator 1 visible outside the restricted viewing angle. In this way, particularly good visual screening can be achieved in the first operating mode B1, because, depending on the screening method implemented, any residual light of the presented image content visible outside the restricted viewing angle can thus be dissolved with high targeting accuracy.

To avoid redundancy, further possible embodiments of the invented method that can be implemented analogously to the above description are not detailed herein.

Figure 7:
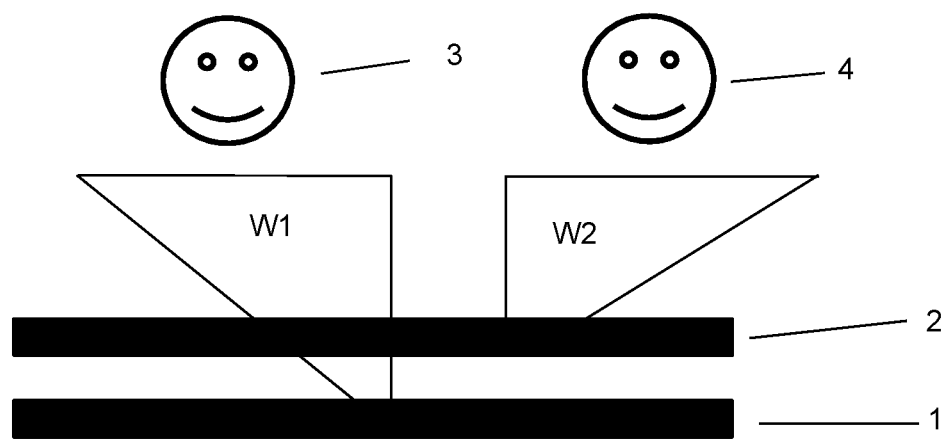
FIG. 7 is a schematic representation of the invented method in an extended embodiment, in which different image contents are radiated into different angular ranges.

FIG. 7 is a schematic representation of the invented method in an extended embodiment, in which different image contents are radiated into different angular ranges W1 and W2. This is a modification of a method for presenting two different image contents I1 and I2 into different viewing angle W1 and W2, comprising the following steps:
 Provision of a first image generator 1, which radiates the image content I1 into the viewing angle W1,
 provision of a second image generator 2, which radiates the image content I2 into the viewing angle W2, wherein the second image generator 2 is arranged in front of the first image generator 1 (as seen in the viewing direction) and is at least partially transparent to light originating from the first image generator 1, wherein the second image generator 2 is adapted to deflect, on at least 50% of its surface, at least 90% of the light passed by it, by maximally 10°, wherein, due to its limited scattering properties, the second image generator 2 scatters only a negligible portion of the light originating from the first image generator (1) when it passes the second image generator (2), so that the viewing angle W1 for the image content I1 is retained.

Here, the viewing angles W1 and W2, which can also be denoted as viewing angle ranges, should be partially or completely different. Overlapping is possible nevertheless, depending on the application. "Different" in this context is meant to include also that, without loss of generality, in a viewing angle W1 a trifle of residual light is released to the same geometric angular range as the viewing angle W2, whereas in the angular range W2 the same geometric angular range receives markedly more light than residual light only.

The image contents I1 and I2 can be radiated into the viewing angles W1 and W2 simultaneously or, if necessary, sequentially.

Here again, the second image generator 2 is favorably adapted to deflect, on at least 80% of its surface or on its total image display surface, at least 90% or preferably more than 95% of the light passed by it, by maximally 10°.

The term "negligible" with regard to scattering means, for example, that in an angle of, e.g., horizontally 40° from the surface normal, scattering adds maximally 1% of the luminance, which the first image generator radiates into an angle of 0°.

In a special configuration, this version of the method makes it possible to define the viewing angles W1 and W2 so that they furnish, either simultaneously or sequentially, both eyes of one and the same viewer with different image contents I1 and I2, so that a spatial impression is achieved.

The aforementioned invented methods and the invented display screen 5 can be used, e.g., inside a motor vehicle. There, for example, the viewer 3 would correspond to a front-seat passenger, and the viewer 4 would correspond to the driver, so that, as the need arises, contents are invisible to the driver. In the last-mentioned method version, the driver can see image content different from that seen by the front-seat passenger.

The invented method described hereinabove and the invented display screen will each solve the problem formulated: They enable a switchable privacy effect for a display screen to be achieved with a simple setup. In addition, the invention can be implemented by simple means, and works largely independent of the manner of creating the privacy effect. The invention further offers a possibility to present different images in different directions.

The invention described hereinabove can be used wherever confidential data are displayed and/or entered, such as, e.g., in entering PIN codes, reading data off cash dispensers or payment terminals, or for privacy protection in handling mobile devices. To particular advantage, however, as described above, the invention can be used in a motor car, if a driver must not be distracted by image content.

The invention claimed is:

1. A method of presenting image content in at least two modes of operation, namely, a first operating mode for a viewing mode with a restricted viewing angle, and a second operating mode for a viewing mode with an unrestricted viewing angle, comprising:
    providing a first image generator, which radiates image content into the restricted viewing angle,
    providing a second image generator, which radiates image content into the unrestricted viewing angle, wherein the second image generator is arranged in front of the first image generator, as seen in a viewing direction, and is at least partially transparent to light originating from the first image generator, wherein the second image generator is adapted to deflect, on at least 50% of its surface, at least 90% of the light passed by it, by maximally 10°,
    switching the first image generator on to start the first operating mode for the viewing mode with the restricted viewing angle, wherein the second image generator is switched to be transparent and, due to its limited scattering properties, scatters only a negligible portion of the light originating from the first image generator when it passes the second image generator, so that the restricted viewing angle is retained,
    switching at least the second image generator on to start the second operating mode for the viewing mode with the unrestricted viewing angle.

2. The method as claimed in claim 1, wherein, in the second operating mode for the viewing mode with the unrestricted viewing angle, the first image generator either is switched off, or, when switched on, displays a dark image content.

3. The method as claimed in claim 1, wherein, in the first operating mode for the viewing mode with the restricted viewing angle, the second image generator, when switched on, displays image content that dissolves potential residual light of the first image generator that is visible outside the restricted viewing angle.

4. The method as claimed claim 1, wherein the second image generator is a transparent LCD, microLED, miniLED, or OLED display screen, wherein transparent means that the second image generator passes at least 15% of the light incident to it from the rear.

5. The method as claimed in claim 1, wherein only part of the display area of the first image generator radiates image content into a restricted viewing angle, whereas the remaining part radiates image content into an unrestricted viewing angle.

6. The method as claimed in claim 1, wherein the first image generator is at least partially transparent, wherein transparent means that the first image generator passes at least 15% of the light incident to it from the rear.

7. The method as claimed in claim 1, wherein switching the second image generator on in the second operating mode for the viewing mode with the unrestricted viewing angle creates a modified operating mode, in which image contents are presented in a restricted viewing angle simultaneously in two planes, with only the contents presented on the second image generator being visible in one plane outside the restricted viewing angle.

8. The method as claimed in claim 1, wherein the first image generator is switchable between a first viewing mode with a restricted viewing angle, and a second viewing mode with an unrestricted viewing angle, so that, with the first viewing mode being used, switching the second image generator to the transparent state will create the first operating mode, and switching on the second image generator will create a third operating mode, in which image content, in a viewing mode with unrestricted viewing angle, will be presented simultaneously in two planes, and that with the first viewing mode being used, switching the second image generator on will create a fourth operating mode, in which image content, in a restricted viewing angle, will be presented simultaneously in two planes, and outside the restricted viewing angle, only the content presented in one plane on the second image generator is viewable.

9. Use of the method of claim 1, the use occurring in a motor vehicle.

10. The method as claimed in claim 2, wherein, in the second operating mode for the viewing mode with the unrestricted viewing angle, the first image generator, when switched on, displays a black, image content.

11. A method for presenting two different image contents, namely a first image content and a second image content in different viewing angles, namely a first viewing angle and a second viewing angle, comprising:
   providing a first image generator, which radiates the first image content into the first viewing angle,
   providing a second image generator, which radiates the second image content into the second viewing angle, wherein the second image generator is arranged in front of the first image generator, as seen in a viewing direction, and is at least partially transparent to light originating from the first image generator, wherein the second image generator is adapted to deflect, on at least 50% of its surface, at least 90% of the light passed by the second image generator, by maximally 10°,
   wherein, due to limited scattering properties of the second image generator, only a negligible portion of the light originating from the first image generator is scattered when it passes the second image generator, so that the first viewing angle for the first image content is retained.

12. Use of the method of claim 11, the use occurring in a motor vehicle.

13. A display screen that is operable in at least two operating modes, namely, a first operating mode for a viewing mode with a restricted viewing angle, and a second operating mode for a viewing mode with an unrestricted viewing angle, comprising:
   a first image generator that radiates image content into the restricted viewing angle;
   a second image generator that radiates image content into the unrestricted viewing angle, wherein the second image generator is arranged in front of the first image generator, as seen in a viewing direction, and is at least partially transparent to light originating from the first image generator, wherein the second image generator is adapted to deflect, on at least 50% of its surface, at least 90% of the light passed by the second image generator, by maximally 10°;
   wherein the first image generator for the first operating mode for the first viewing mode with the restricted viewing angle is configured to be switched on for the viewing mode with the restricted viewing angle, and wherein the second image generator is configured to be switched to a transparent state when the first image generator is switched on for the first viewing mode with the restricted viewing angle and, due to limited scattering properties of the second image generator, scatters only a negligible-portion of the light originating from the first image generator when the light originating from the first image generator passes the second image generator, so that the restricted viewing angle is retained, and
   wherein the second image generator is configured such that at least the second image generator is switched on to start the second operating mode for the viewing mode with the unrestricted viewing angle.

14. The display screen as claimed in claim 13, wherein, in the first operating mode for the viewing mode with the restricted viewing angle, the second image generator is further configured such that, when switched on, the second image generator presents image content that dissolves potential residual light of the first image generator visible outside the restricted viewing angle.

15. Use of the display screen of claim 13, the use occurring in a motor vehicle.

16. The display screen of claim 13, wherein the display screen is configured for use in a motor vehicle.

* * * * *

UNITED STATES PATENT AND TRADEMARK OFFICE
CERTIFICATE OF CORRECTION

PATENT NO. : 11,378,831 B2
APPLICATION NO. : 17/150405
DATED : July 5, 2022
INVENTOR(S) : André Heber, Yannick Bourgin and Markus Klippstein It is certified that error appears in the above-identified patent and that said Letters Patent is hereby corrected as shown below:

On the Title Page

Column 2, Item (57), under "ABSTRACT", Line 5, delete "a" and insert -- the --, therefor.

Column 2, Item (57), under "ABSTRACT", Line 7, delete "an" and insert -- the --, therefor.

In the Claims

In Column 10, Claim 4, Line 28, delete "claimed" and insert -- claimed in --, therefor.

Signed and Sealed this
Fourth Day of October, 2022

Katherine Kelly Vidal
*Director of the United States Patent and Trademark Office*